United States Patent
Principe et al.

(10) Patent No.: US 9,424,652 B2
(45) Date of Patent: Aug. 23, 2016

(54) ADAPTIVE BACKGROUND ESTIMATION

(75) Inventors: Jose Carlos Principe, Gainesville, FL (US); Goktug Tankut Cinar, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 218 days.

(21) Appl. No.: 14/130,129

(22) PCT Filed: Jun. 12, 2012

(86) PCT No.: PCT/US2012/042045
§ 371 (c)(1),
(2), (4) Date: Mar. 10, 2014

(87) PCT Pub. No.: WO2013/003026
PCT Pub. Date: Jan. 3, 2013

(65) Prior Publication Data
US 2014/0193072 A1    Jul. 10, 2014

Related U.S. Application Data

(60) Provisional application No. 61/503,089, filed on Jun. 30, 2011.

(51) Int. Cl.
*G06K 9/34*    (2006.01)
*G06T 7/00*    (2006.01)

(52) U.S. Cl.
CPC ............. *G06T 7/0081* (2013.01); *G06T 7/0087* (2013.01); *G06T 2207/20144* (2013.01)

(58) Field of Classification Search
CPC ................... G06T 2207/20144; G06T 7/0081; G06T 7/0087
See application file for complete search history.

(56) References Cited

U.S. PATENT DOCUMENTS

| | | | |
|---|---|---|---|
| 7,224,735 B2 | 5/2007 | Porikli et al. | |
| 7,359,552 B2 | 4/2008 | Porikli | |
| 8,233,873 B2 | 7/2012 | Principe et al. | |
| 8,244,787 B2 | 8/2012 | Principe et al. | |
| 8,611,839 B2 | 12/2013 | Principe et al. | |

(Continued)

OTHER PUBLICATIONS

Singh et al, "Using Correntropy as a Cost Function in Linear Adaptive Filters", Proceedings of International Joint Conference on Neural Networks, Atlanta, Georgia, USA, Jun. 14-19, 2009; pp. 2950-2955.*

(Continued)

*Primary Examiner* — Phuoc Tran
(74) *Attorney, Agent, or Firm* — Wolf, Greenfield & Sacks, P.C.

(57) ABSTRACT

Various methods and systems are provided for adaptive background estimation. In one embodiment, among others, a signal processing device includes at least one processing unit and a memory storing a background estimation system executable in the at least one processing unit. The background estimation system, when executed, causes the signal processing device to separate foreground objects from at least one image frame in a sequence of image frames based at least in part upon a correntropy cost function. In another embodiment, a method includes obtaining an image frame from a sequence of image frames; performing correntropy filtering on the image frame to separate foreground objects from the image frame; and providing the foreground objects for rendering. The correntropy filtering may adapt to compensate for diffusion effects in the image frame.

20 Claims, 15 Drawing Sheets

(56) References Cited

U.S. PATENT DOCUMENTS

| | | | |
|---|---|---|---|
| 2004/0239762 A1* | 12/2004 | Porikli | G06K 9/32 348/169 |
| 2006/0126933 A1* | 6/2006 | Porikli | G06K 9/38 382/173 |
| 2010/0208987 A1* | 8/2010 | Chang | G06K 9/342 382/165 |
| 2011/0116584 A1* | 5/2011 | Hunt, Jr. | G06T 7/20 375/350 |
| 2013/0132315 A1 | 5/2013 | Principe et al. | |
| 2013/0211829 A1 | 8/2013 | Principe et al. | |

OTHER PUBLICATIONS

International Search Report and Written Opinion dated Jan. 28, 2013 in connection with Application No. PCT/US2012/042045.

International Preliminary Report on Patentability dated Jan. 16, 2014 in connection with Application No. PCT/US2012/042045.

* cited by examiner (a)

(b)

(c)

(d)

(a)          (b)

(a)          (b)

ADAPTIVE BACKGROUND ESTIMATION

CROSS REFERENCE TO RELATED APPLICATIONS

This application claims priority to U.S. provisional application entitled "ADAPTIVE BACKGROUND ESTIMATION" having Ser. No. 61/503,089, filed Jun. 30, 2011, the entirety of which is hereby incorporated by reference.

STATEMENT REGARDING FEDERALLY SPONSORED RESEARCH OR DEVELOPMENT

This invention was made with government support under agreement 0856441 awarded by the National Science Foundation. The Government has certain rights in the invention.

BACKGROUND

In applications such as video surveillance, foreground objects may be separated from the background using background estimation. A Kalman Filter (KF) can provide an optimal solution to the estimation problem in a setting where all the processes are Gaussian random processes. However, in non-Gaussian settings, the KF exhibits sub-optimal estimation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
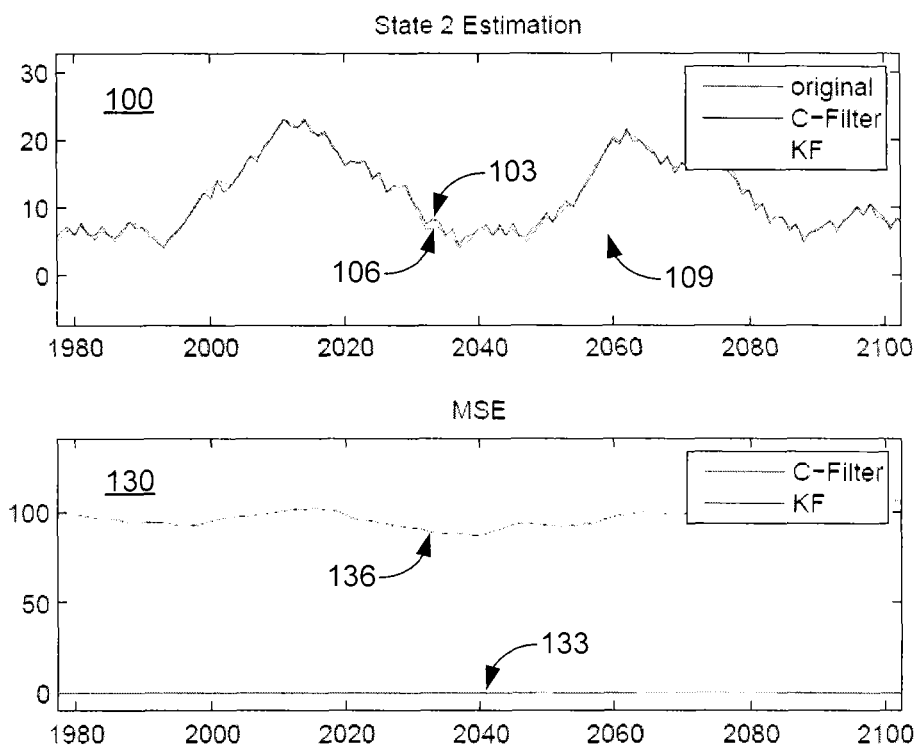
FIGS. 1 and 2 are plots illustrating examples of processing results of simulated data for both the Kalman Filter (KF) and the correntropy filter (C-Filter) in accordance with various embodiments of the present disclosure.

Disclosed herein are various embodiments of systems and methods related to background estimation systems using correntropy. Reference will now be made in detail to the description of the embodiments as illustrated in the drawings, wherein like reference numbers indicate like parts throughout the several views.

The present disclosure describes various embodiments using a correntropy cost function for background estimation. Adaptive background estimation systems are useful in a variety of image processing applications such as, e.g., surveillance for security, traffic monitoring on roads and highways, video of sports events, or other applications where foreground objects are extracted from the background of a sequence of images. An adaptive system that implements an information theoretic cost function utilizing a similarity measure of correntropy as a performance index may be used to extract higher order information from the signals.

A system can be described by the equation:

$$x_k = F_{k|k-1} x_{k-1} + w_{k-1} \qquad \text{EQN. 1}$$

with a measurement equation of:

$$y_k = H_k x_k + v_k \qquad \text{EQN. 2}$$

where $w_k$ and $v_k$ are independent, zero mean, Gaussian noise processes with covariance matrices $Q_k$ and $R_k$, respectively.

While the formulation of a Kalman Filter (KF) can be derived using in various ways such as using the orthogonality principle or the innovations approach, there is a derivation that can be achieved by the optimization of a cost function (J) given by:

$$J = \frac{1}{2}(y_k - H_k x_k)^T R_k^{-1}(y_k - H_k x_k) + \frac{1}{2}(x_k - x_k^-)^T M_k^{-1}(x_k - x_k^-) \qquad \text{EQN. 3}$$

where $M_k$ is the covariance matrix of $(x_k - x_k^-)$ and:

$$x_k^- = F_{k|k-1} x_{k-1}. \qquad \text{EQN. 4}$$

The value $\hat{x}_k = \operatorname{argmin}_{x_k} J(x_k)$ will be the best estimate. In this discussion, the system parameters are considered fixed for simplicity; however the formulation can be easily extended to include the time-varying case. Accordingly, for this discussion $F = F_{k|k-1}$ and $H = H_k$ will be used for the system and measurement matrices, respectively.

The formulation of KF can be derived by analytically solving:

$$\frac{\partial J}{\partial x_k} = 0 \qquad \text{EQN. 5}$$

Beyond the formulation that is achieved through this optimization process, there is an important message embedded in the cost function of EQN. 3. It states that the main goal of the estimation process is to reduce the effect of the two sources of uncertainties in the dynamic system: the uncertainty in the system noise $w_k$ and the uncertainty in the measurement noise $v_k$. The KF tries to account for these uncertainties and, as it propagates the covariance matrix of the error through the iterations, it only makes use of the second order information in the measurements. Therefore, it is optimal where only Gaussian uncertainties exist, however it is sub-optimal when the gaussianity condition is loosened. There are many applications where the gaussianity condition would not hold, resulting in sub-optimal solutions when using the KF.

Utilizing the information available in the higher-order statistics of the signals would improve the filtering solution. One such measure that takes into account higher-order information is correntropy. Consider two scalar random variables X, Y $\in \Re$. Cross-correntropy is a generalized similarity measure between two arbitrary scalar random variables X and Y defined by:

$$v(X,Y) = E_{XY}[\kappa(X,Y)] = \iint \kappa(x,y) p_{X,Y}(x,y) dx dy \qquad \text{EQN. 6}$$

Where $\kappa(\cdot,\cdot)$ is any continuous positive definite kernel. In this formulation, the Gaussian kernel $G_\sigma(\cdot,\cdot)$ is employed. Therefore, EQN. 6 becomes:

$$v(X,Y) = E_{XY}[G_\sigma(X,Y)] = \iint G_\sigma(x,y) p_{X,Y}(x,y) dx dy \qquad \text{EQN. 7}$$

where $\sigma$ is the kernel size or bandwidth. As only limited amount of data is available and the joint PDF is unknown, a sample estimator is used to estimate the similarity instead of the expectation operator.

$$\hat{v}_{\sigma,N}(X,Y) = \frac{1}{N}\sum_{i=1}^{N} G_\sigma(x_i - y_i) \qquad \text{EQN. 8}$$

One advantageous property of correntropy is that it is positive and bounded and with a Gaussian kernel it reaches its maximum if and only if X=Y. Another important property is that, for the Gaussian kernel, correntropy is a weighted sum of all the even moments of the random variable Y−X. This follows from the Taylor series expansion of the Gaussian function in EQN. 7:

$$v_\sigma(X,Y) = \frac{1}{\sqrt{2\pi}\,\sigma} \sum_{n=0}^{\infty} \frac{(-1)^n}{2^n \sigma^{2n} n!} E[(X-Y)^{2n}] \qquad \text{EQN. 9}$$

As seen in EQN. 9, the correntropy is the sum of all even moments when the Gaussian kernel is used. The kernel size appears as a parameter weighting the second-order and higher-order moments. With a very large kernel size $\sigma$ compared to the dynamic range of the data, this similarity measure approaches correlation.

With the correntropy being the weighted sum of all even order moments of the random variable, it is useful to employ it as the cost function in a correntropy filter (C-Filter). Therefore, the cost function ($J_c$) to be optimized is:

$$J_c = v(\|y_k - Hx_k\|) + \frac{1}{L} v(\|x_k - Fx_{k-1}\|) \qquad \text{EQN. 10}$$

which can be estimated by:

$$J_c = \frac{1}{N}\sum_{i=1}^{N} G_\sigma(\|y_i - Hx_i\|) + \frac{1}{LN}\sum_{i=1}^{N} G_\sigma(\|x_i - Fx_{i-1}\|) \qquad \text{EQN. 11}$$

The Euclidean norm is used to enable the application of correntropy to a multiple-state multiple-output system. Choosing N=1 to use the instantaneous gradient simplifies EQN. 11 to:

$$J_c = G_\sigma(\|y_i - Hx_i\|) + \frac{1}{L} G_\sigma(\|x_i - Fx_{i-1}\|) \qquad \text{EQN. 12}$$

The value $\hat{x}_i = \operatorname{argmin}_{x_i} J_c(x_i)$ will be the best estimate. To make the derivation easily followed, the cost function ($J_c$) is split into two parts given by:

$$J_1 = G_\sigma(\|y_i - Hx_i\|) \qquad \text{EQN. 13}$$

$$J_2 = \frac{1}{L} G_\sigma(\|x_i - Fx_{i-1}\|) \qquad \text{EQN. 14}$$

so that:

$$\frac{\partial J}{\partial x_i} = \frac{\partial J_1}{\partial x_i} + \frac{\partial J_2}{\partial x_i} \qquad \text{EQN. 15}$$

with:

$$\frac{\partial J_1}{\partial x_i} = \frac{1}{\sigma^2} G_\sigma(\|y_i - Hx_i\|)(y_i - Hx_i)^T H \qquad \text{EQN. 16}$$

$$\frac{\partial J_2}{\partial x_i} = \frac{-1}{L\sigma^2} G_\sigma(\|x_i - Fx_{i-1}\|)(x_i - Fx_{i-1}) \qquad \text{EQN. 17}$$

The C-Filter may be utilized in practical applications such as, e.g., image processing. For example, in video surveillance or other image processing applications it may be advantageous to estimate the background and separate foreground objects from the background in a series of images. This can allow for detection of sudden changes in the scene or enables for tracking the movement of objects/subjects through the series of images. The separated foreground objects may then be used for object identification through pattern recognition processes, determination of time at location, speed of movement, or other identifiable patterns as can be understood. Usage of a KF without a regularizer is problematic in this setting because of the properties of the mean squared error (MSE) cost. A KF would try to adapt more with respect to the sudden changes in the pixel values of the images. On the other hand, a C-Filter utilizing a correntropy cost function will tend to neglect the outliers and therefore discount the sudden changes in the pixel values.

Image processing using the C-Filter may be implemented in a signal processing device as will be discussed in more detail below. Initially, the C-Filter was tested using simulated data for comparison with KF results. To create the data, a two dimensional rotation matrix was used. The system had no inputs and was driven by Gaussian mixture noise. The noise mixture consisted of two Gaussian distributions centered at 0 and 2, both with a variance of 0.1. The observed signal was the sum of the hidden states.

Referring to FIG. 1, shown are plots illustrating the processing results for both the KF and the C-Filter. As can be seen in the state estimation plot 100 of FIG. 1, the state 2 estimation curve 103 of the C-Filter closely tracks the original state curve 106. In contrast, the state 2 estimation curve 109 of the KF is consistently below the original state curve 106, illustrating the superior performance of the C-Filter. The MSE plot 130 further emphasizes difference in the MSE error between the C-Filter (curve 133) and the KF (curve 136).

Figure 2:
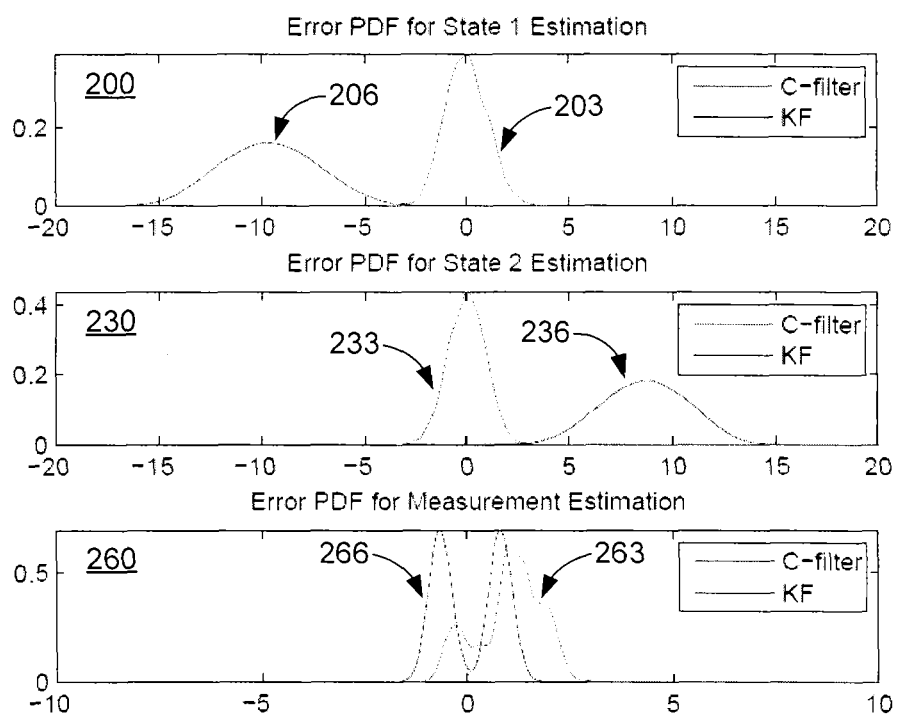

Referring next to FIG. 2, shown are probability density function (PDF) plots illustrating the error PDF for the estimations of both the KF and the C-Filter. As can be seen in the error PDF plots 200 and 230, the C-Filter places the error distributions at 0 (curves 203 and 233), which is very desirable, and results in a smaller error variance than the error distribution curves 206 and 236 of the KF. In the measurement estimation plot 260, the C-Filter fails to place the error distribution curve 263 around 0, however the mean is close to 0 and the variance is of the same order as the distribution curve 266 of the KF.

As mentioned above, the C-Filter may also be used to filter a sequence of images (e.g., video images) to separate foreground objects from the background. A C-Filter is applied to each pixel of the image sequence. The three hidden states are the RGB values of the pixels of background. F and H are both an identity matrix. Having an identity matrix for the system matrix indicates that there no expectation that the states will change, which is consistent with trying to identifying an invariant background. The pixel values of the current image frame directly relate to the state measurement. The noise term in the state equation refers to the moving foreground objects and the noise in the measurement equation refers to the noise introduced by the sensors, such as salt and pepper noise.

Figure 3:
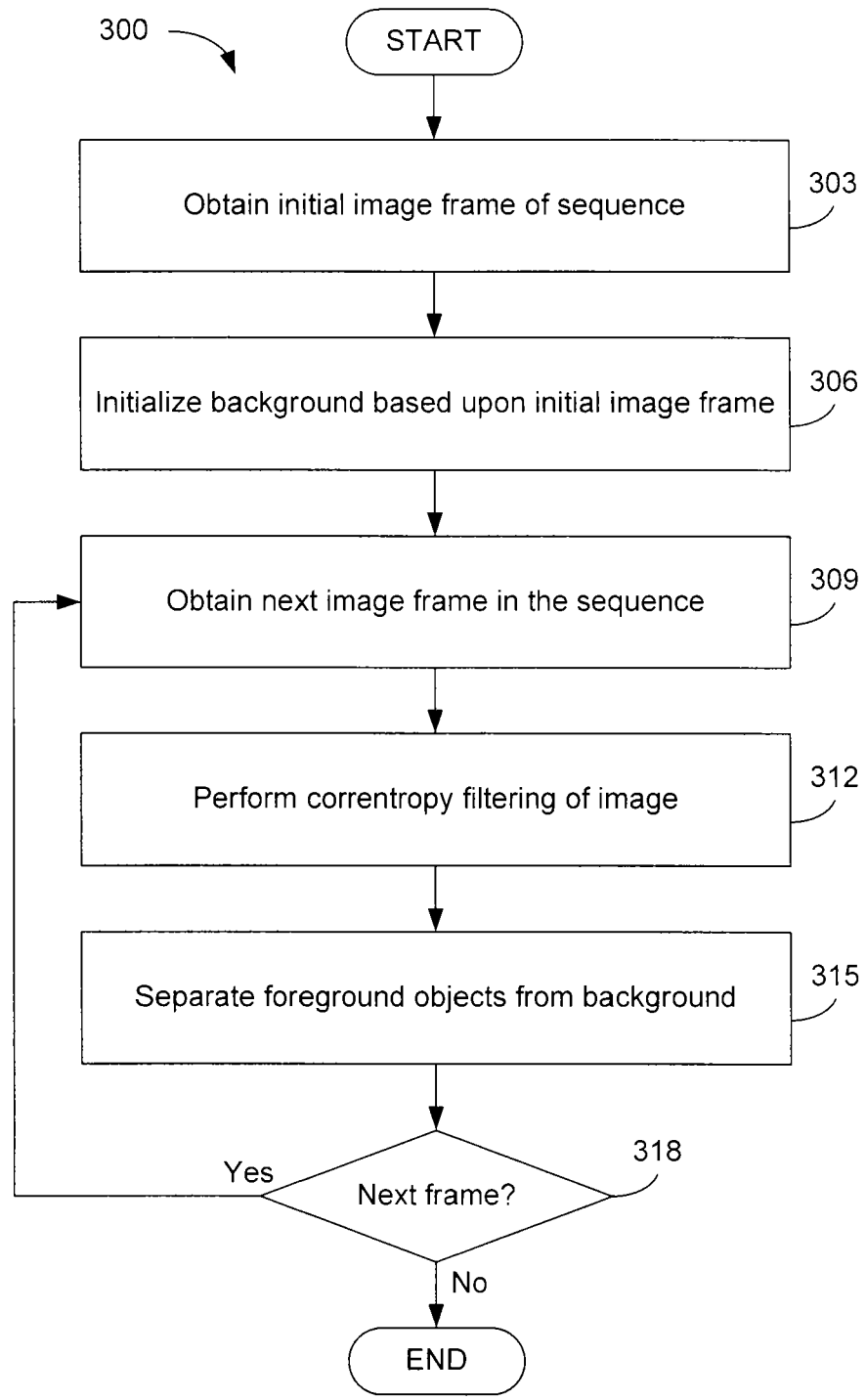
FIG. 3 is a flow chart illustrating an example of adaptive background estimation of a sequence of images by a signal processing device in accordance with various embodiments of the present disclosure.

Referring now to FIG. 3, shown is a flow chart 300 illustrating an example of adaptive background estimation of a sequence of images such as, e.g., video sequence by a signal processing device. Starting with block 303, the initial image frame of the sequence is obtained. The background is initialized as the initial frame in block 306. The next image frame in the sequence is obtained in block 309 and correntropy filtering is performed in block 312. In other embodiments, the background is initialized using a random pattern or predefined pattern (e.g., all white, all black, or other predefined pattern of colors) and the initial image frame is the next image frame obtained in block 309.

In block 315, foreground images are separated from the background based at least in part upon the correntropy cost function. The current, separated foreground and background frames may then be stored in a data store for subsequent access and/or provided individually or in combination for rendering on a display device. If another frame is to be processed (block 315), then the adaptive background estimation returns to block 309 to repeat the correntropy filtering (block 312) and separation of foreground objects (block 315) for the next image in the sequence. The C-Filter works with each incoming frame in an unsupervised manner. As a result the filter manages to extract the background, eliminate the salt and pepper noise and adapt to the changes in the background scene; such as removing a vehicle that left the parking lot from the background or phasing a newly parked vehicle from foreground to background.

Figure 4:
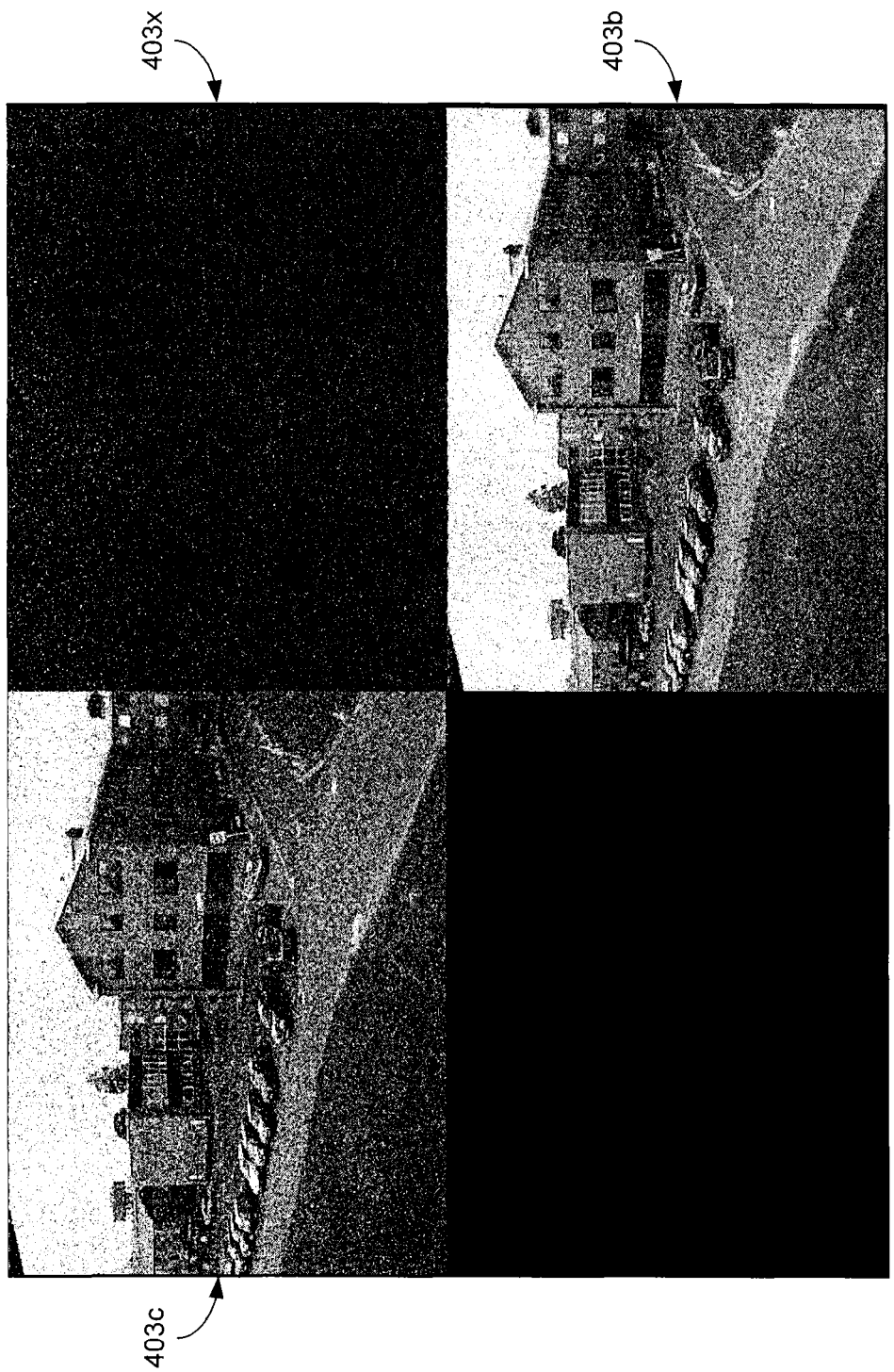
FIGS. 4-6 are examples of image frames illustrating adaptive background estimation of a video sequence using a C-Filter in accordance with various embodiments of the present disclosure.
Figure 5:
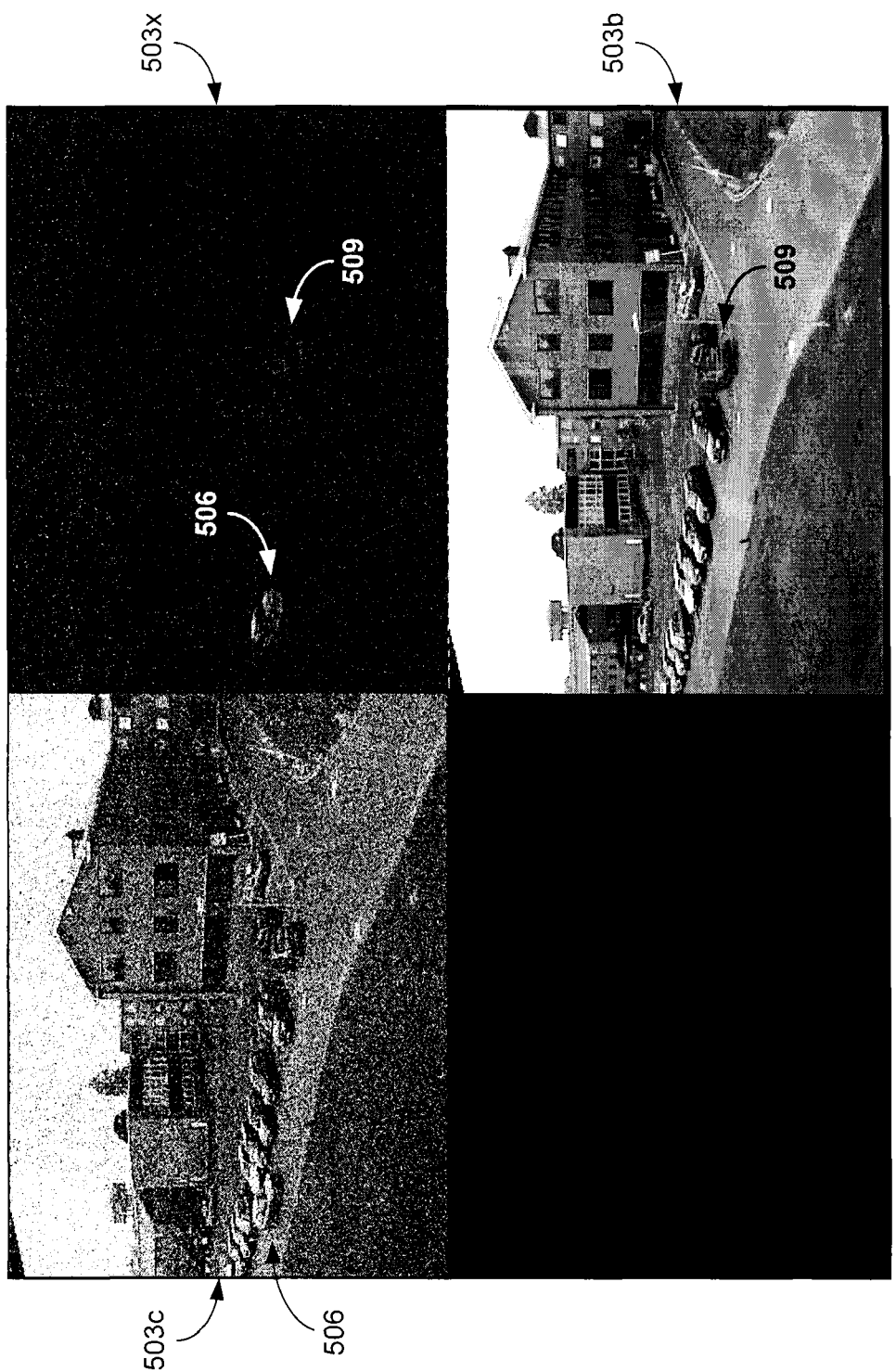
Figure 6:
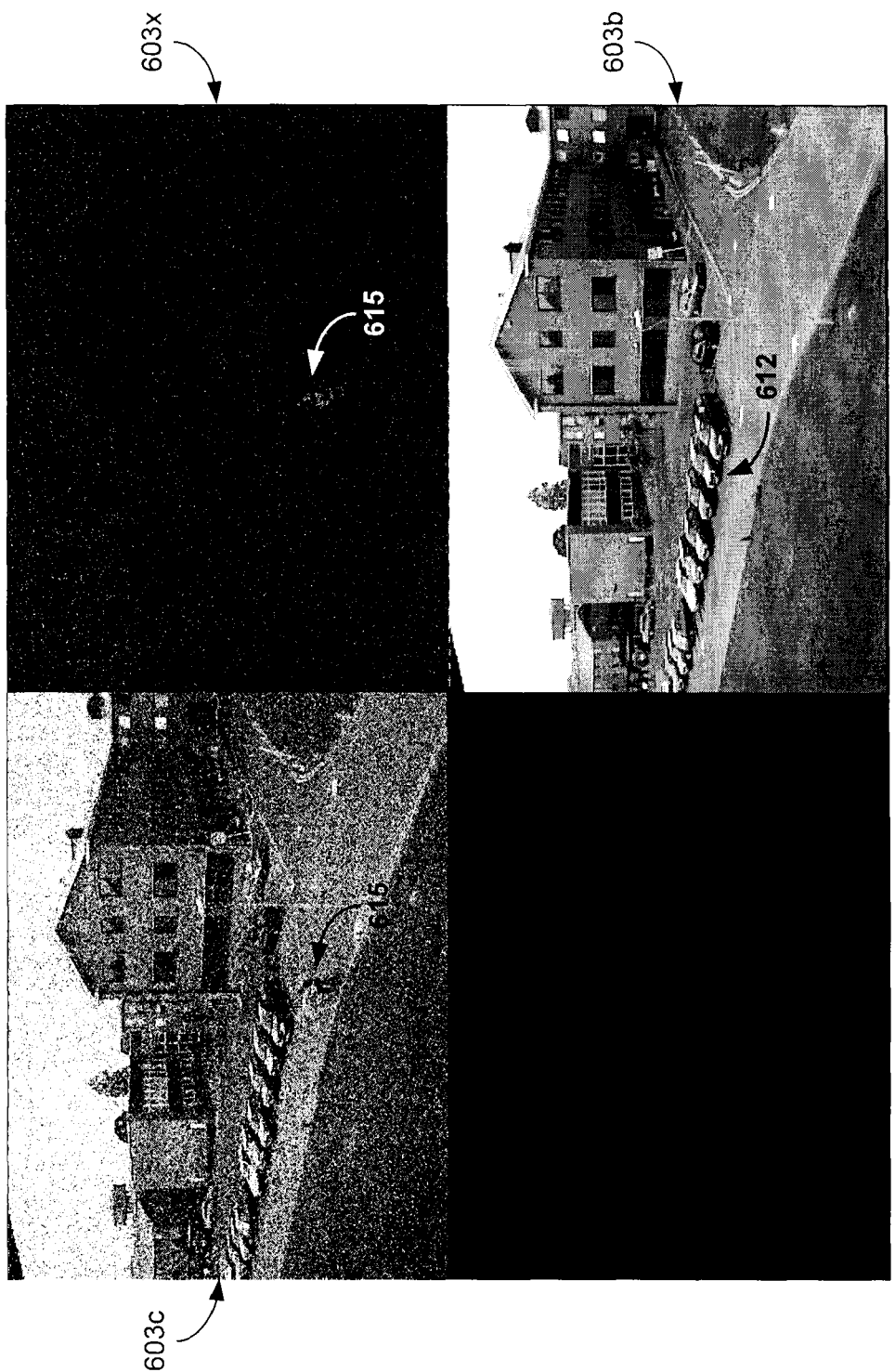

With reference to FIGS. 4-6, shown are image frames illustrating an example of adaptive background estimation of a video sequence using the C-Filter. The C-Filter gradually learns the static background and eliminates the salt and pepper measurement noise as well as moving foreground objects. The adaptive background estimation also manages to include new objects in the background and exclude objects that are no longer present. The adaptation of the background is based upon the measurement error in the cost function and the adaptation can be done very quickly.

FIG. 4 illustrates the background estimation of the 10th frame in the video sequence. The current frame 403c is located on top left, a frame 403x including the extracted foreground is on top right, and, a frame 403b including the estimated background is on bottom right. Note that while a portion of the measurement noise has been extracted in frame 403b, the C-Filter is still learning the background.

FIG. 5 illustrates the background estimation of the 1003rd frame in the video sequence. Again, the current frame 503c is located on top left, the frame 503x including the extracted foreground is on top right, and, the frame 503b including the estimated background is on bottom right. Notice that the C-Filter has adapted to remove a significant portion of the salt and pepper measurement noise from the background frame 503b. In addition, the C-Filter has extracted the car 506 that is driving through the parking lot and is phasing out the car 509 that is leaving the parking spot.

FIG. 6 illustrates the background estimation of the 2808th frame in the video sequence. Again, the current frame 603c is located on top left, the frame 603x including the extracted foreground is on top right, and, the frame 603b including the estimated background is on bottom right. Note that the C-Filter has adapted the background to the new scene with car 509 (FIG. 5) being removed and adding car 612 that was parked between the 1003rd frame of FIG. 5 and the 2808th frame of FIG. 6. In addition, the C-Filter has completely discarded the bicycle rider 615 from the background frame 603b.

Figure 7:
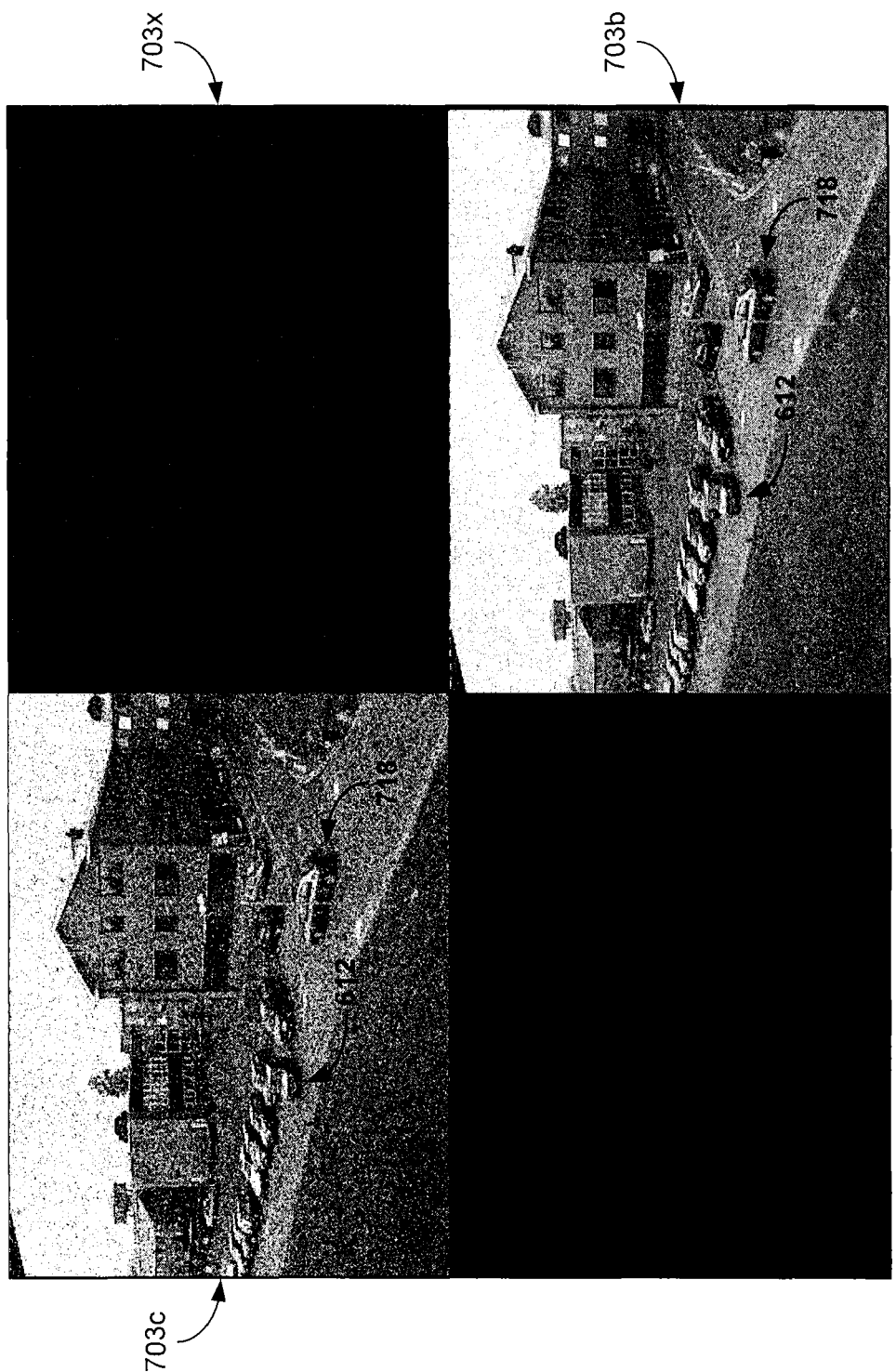
FIG. 7 is examples of image frames illustrating adaptive background estimation of the video sequence of FIGS. 4-6 using a KF.

When the KF is applied on the same video sequence, the outcome is as expected. FIG. 7 illustrates the background estimation of the 1303rd frame in the video sequence using the KF. The current frame 703c is located on top left, the frame 703x including the extracted foreground is on top right, and, the frame 703b including the estimated background is on bottom right. The estimated background in frame 703b is almost exactly the same as current frame 703c of the video stream. While the KF manages to reduce the effect of the salt and pepper measurement noise in the video stream, it fails to eliminate it completely or even to the level removed by the C-Filter as depicted in frame 503b of FIG. 5. Nor is the KF able to extract either car 612 as it is maneuvered into the parking spot or care 718 as it passes through the parking lot. This is because of the over-reaction of MSE cost function to the outliers (in this case foreground objects and measurement noise).

Figure 8:
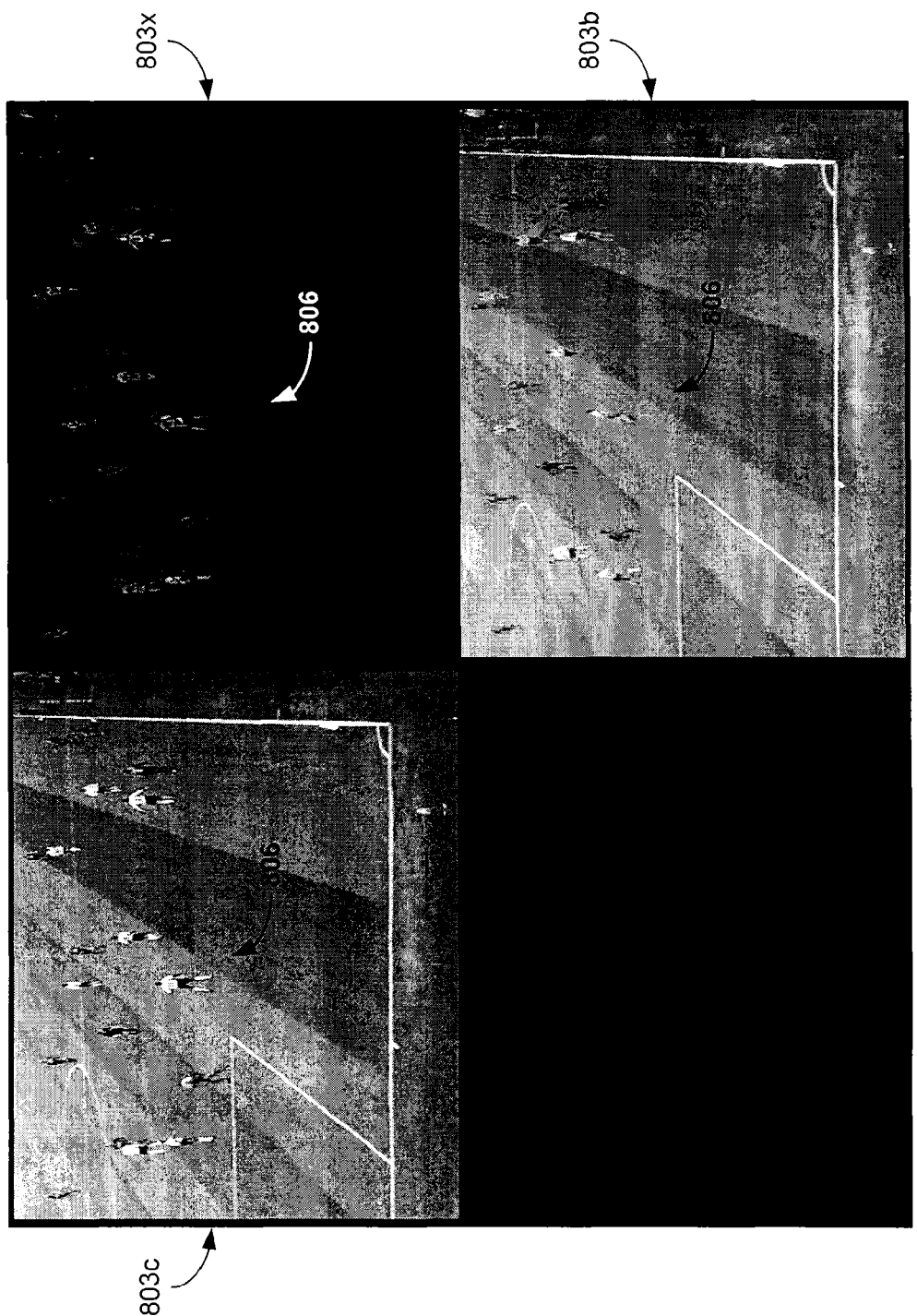
FIGS. 8-10 are examples of image frames illustrating adaptive background estimation of a video sequence using a C-Filter in accordance with various embodiments of the present disclosure.
Figure 9:
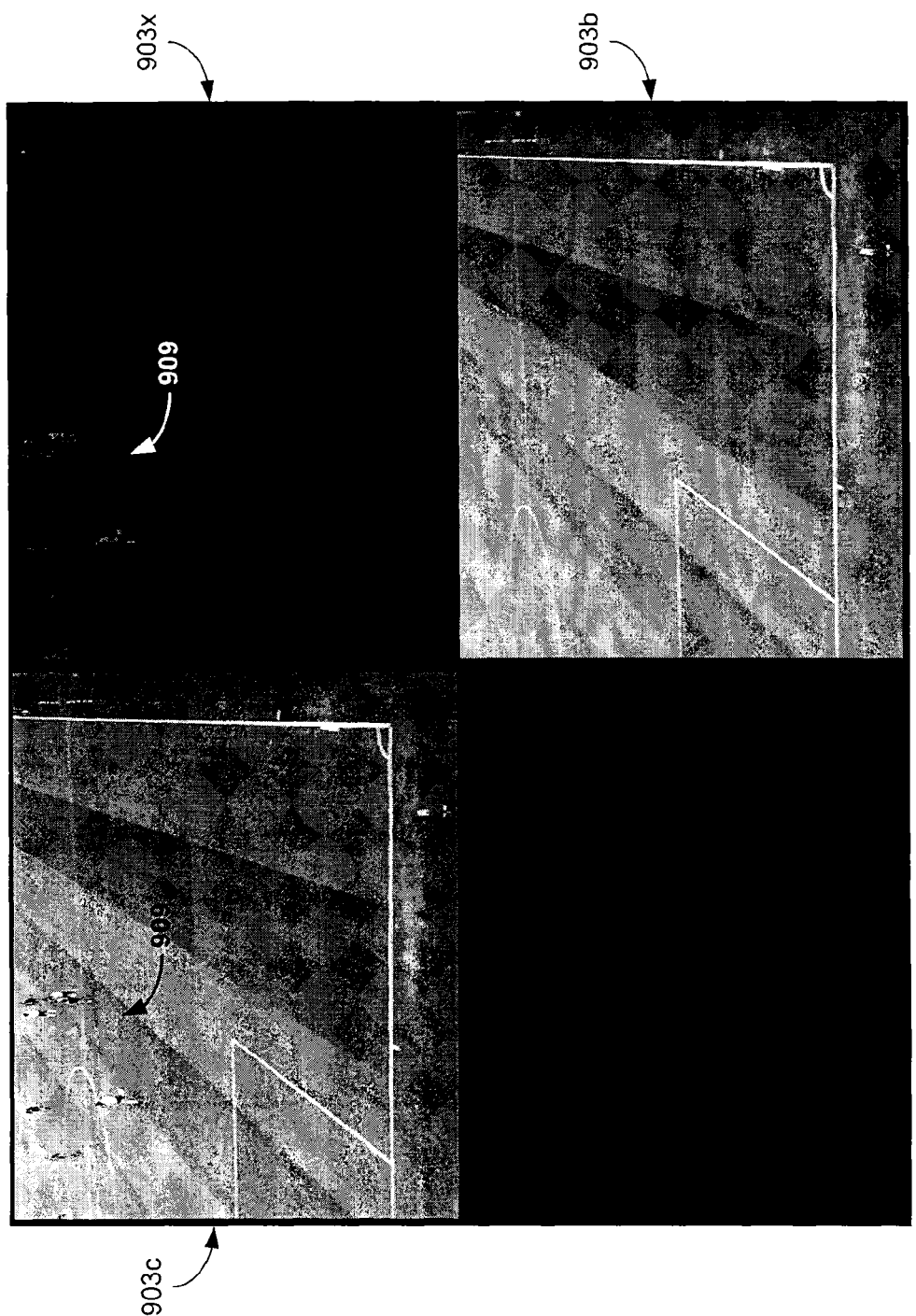
Figure 10:
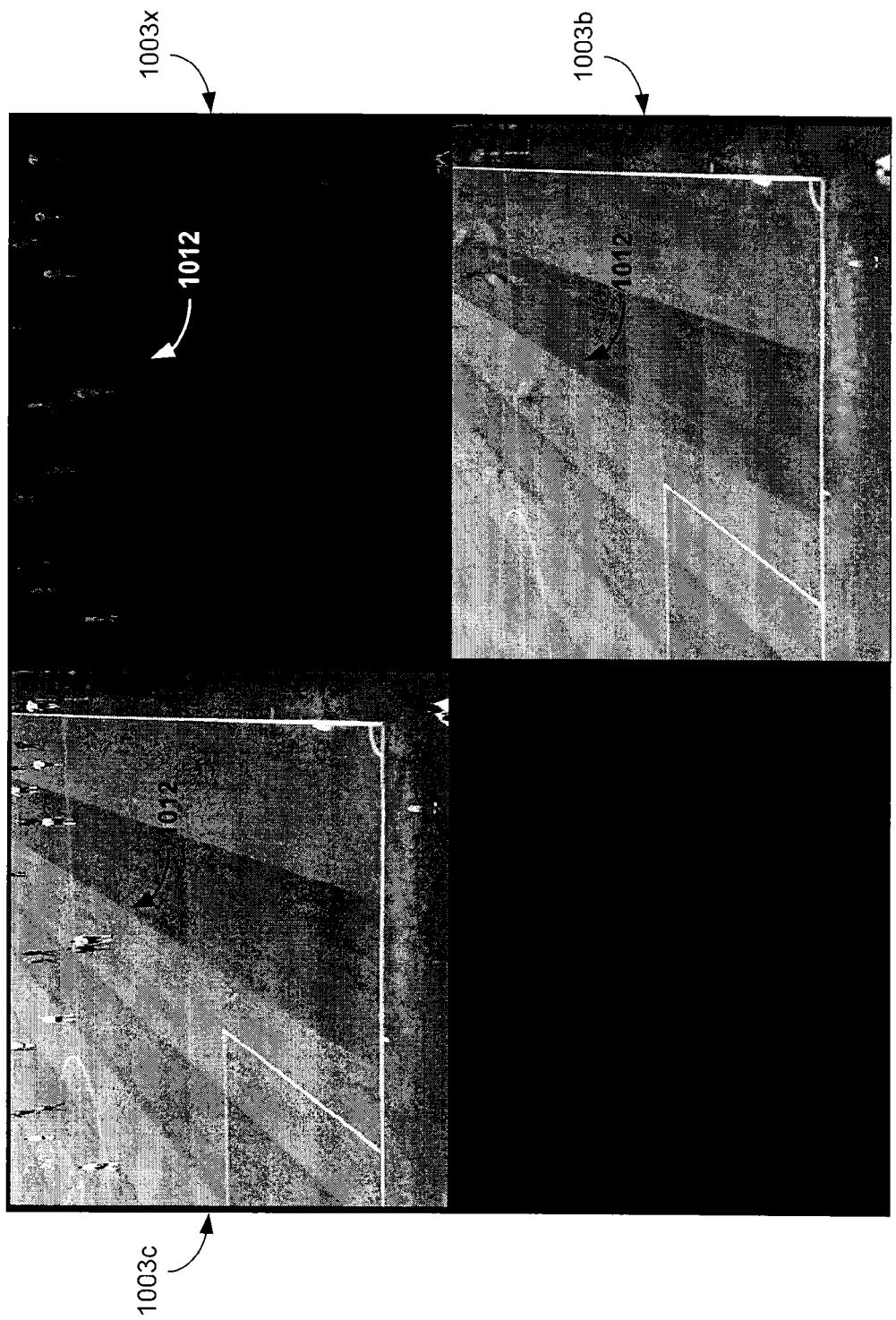

With reference to FIGS. 8-10, shown are image frames illustrating another example of adaptive background estimation of a video sequence using the C-Filter. The example of FIGS. 8-10 is a sporting event and is more challenging as there are many moving objects at the same time. No measurement noise was included in the video sequence. Again the initialization was done by setting the first frame as the initial background. When the players are moving, the C-Filter extracts them from the background, however as the game stops and the players rest they start to appear faintly in the background frame, which demonstrates the adaptive force of the method.

FIG. 8 illustrates the background estimation of the 50th frame in the video sequence. The current frame 803c is located on top left, a frame 803x including the extracted foreground is on top right, and, a frame 803b including the estimated background is on bottom right. Because of the motion, the players 806 have been at least partially extracted from the background. While the players 806 appear faintly in the background, it does not affect the quality of the image frame 803b. This faint reappearance makes it easier to track the players and their movement. Further, the intensity of the players may be used to determine the time a player has remained in that location. Notice that the C-Filter is still learning the background and there are artifacts left from the initial frame.

FIG. 9 illustrates the background estimation of the 1283rd frame in the video sequence. Again, the current frame 903c is located on top left, a frame 903x including the extracted foreground is on top right, and, a frame 903b including the estimated background is on bottom right. Notice that the C-Filter has almost perfectly separated the foreground objects (i.e., players 909) in frame 903x from the background frame 903b.

FIG. 10 illustrates the background estimation of the 2363rd frame in the video sequence. Again, the current frame 1003c is located on top left, a frame 1003x including the extracted foreground is on top right, and, a frame 1003b including the estimated background is on bottom right. Notice that the C-Filter has almost perfectly separated the foreground objects (i.e., players 909) in frame 903x from the background frame 903b. Note that, because the game has stopped for a player to throw in the ball, the players 1012 start to faintly appear in the background frame 1003b.

The examples of FIGS. 4-6 and 8-10 illustrate the performance of the C-Filter for hidden state estimation in systems with non-Gaussian uncertainties. The cost function uses the information theoretic measure of correntropy. Correntropy is a weighted sum of all even moments of its argument, which is useful in non-zero mean and non-Gaussian environments. The C-Filter has the free parameter called the kernel bandwidth (or size) that controls the behavior of the C-Filter. The C-Filter behavior is very similarly to the KF when it uses very large kernel bandwidth. When the kernel size is close to the dynamic range of the inputs, it uses higher order statistics and outperforms KF in non-Gaussian environments. The immunity of the correntropy measure to outliers provides the ability to identify the background of a video sequence (or other series of images) and adaptively change it with respect to the changes in the environment.

For the adaptive background estimation discussed above, a kernel bandwidth of 1.5 was utilized as the RGB values are between 0 and 1. The other free parameter is step size, which may be adjusted based upon a fixed point update rule. This would eliminate the step size parameter as well as speeding up the convergence. In addition, as the correntropy measure is a weighted sum of even moments, a recursive least-squares (RLS) type of algorithm may be applied to speed up the convergence.

In video surveillance applications, it can be very important to estimate background and separate foreground objects from the background. This can facilitate detection of sudden changes in a scene or may enable tracking the movement of objects and/or subjects. As the correntropy cost function will tend to neglect the outliers and therefore neglect the sudden changes in the pixel values, video surveillance can be a suitable application for the filter.

In the background estimation model discussed above, it was assumed that there is a filter for each pixel of the video sequence. The three hidden states were the RGB values of the pixels of background. It was assumed that both the system transition matrix F and the measurement matrix H are identity matrices (I). Having an identity matrix for the system transition matrix means that the states are not expected to change. As we have measured the pixel values of the current frame, the states directly relate to the measurements via the selection of H=I. The noise term $w_k$ in the system state equation (EQN. 1) refers to the moving foreground objects and the noise term $v_k$ in the measurement equation (EQN. 2) refers to the noise introduced by the sensors such as, e.g., salt and pepper noise.

Even though the assumed models of system transition and measurement matrices are convenient and reasonable, they do not provide for full usage of the hidden state model. Adaptation of the system transition matrix may allow the system to work under more complicated scenarios. Such adaptation may take place during the performance of the correntropy filtering in block 312 of FIG. 3. For example, adaptation of the system transition matrix may account for diffusion within an image, which may be introduced by, e.g., jitter of the device used to capture the series of images (e.g., video images).

In the previous analysis, the image capture device was assumed to be fixed without any jitter, which may not be possible in situation such as, e.g., outdoor security cameras and surveillance cameras attached to loose surfaces. To allow for some jitter in the video recordings, the following adaptive diffusion model for the system transition matrix F may be used while keeping the measurement matrix as an identity matrix. It is assumed that there is diffusion from a pixel to the neighboring pixels. Consider a neighborhood of radius one, by which is meant that a pixel has at most eight neighbor pixels which are adjacent to the pixel.

$$I_t(x, y) = (1-\alpha)I_{t-1}(x, y) + \frac{\alpha}{8}\sum_{i=-1}^{1}\sum_{j=-1}^{1}I_{t-1}(x+i, y+j) \qquad \text{EQN. 18}$$

Therefore for a diffusion parameter $\alpha$, the elements on the main diagonal of the system transition matrix are $1-\alpha$. The elements that correspond to the leakage to neighboring pixels are $\alpha/8$; i.e. for neighboring pixels i and j, $F_{i,j}=F_{j,i}=\alpha/8$. When the pixels of an image are numbered with the order from top to bottom and left to right, this is equivalent to concatenating the columns of the image in the order from left to right to create the state vector. A sample system transition matrix is given by EQN. 19, and illustrated in FIG. 11, to display the structure of the matrix in this setup.

$$F = \begin{bmatrix} 1-\alpha & \frac{\alpha}{8} & 0 & \frac{\alpha}{8} & \cdots \\ \frac{\alpha}{8} & 1-\alpha & \frac{\alpha}{8} & 0 & \cdots \\ 0 & \frac{\alpha}{8} & 1-\alpha & \frac{\alpha}{8} & \cdots \\ \cdots & \cdots & \cdots & \cdots & \cdots \end{bmatrix} \qquad \text{EQN. 19}$$

Figure 11:
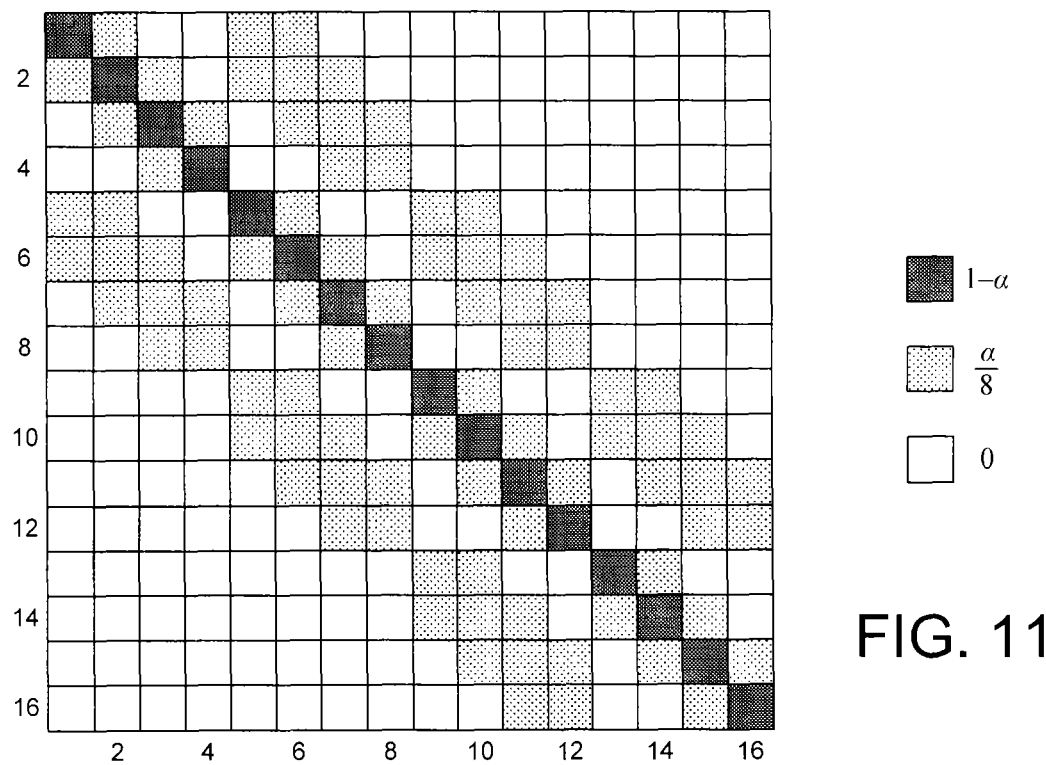
FIG. 11 is a graphical representation illustrating an example of a structure of a system transition matrix for a 4×4 image in accordance with various embodiments of the present disclosure.

FIG. 11 shows the structure of the system transition matrix for a 4×4 image. The pixels are vectorized to create state vectors as discussed above. For simplicity, a grayscale image is assumed but the adaptive diffusion model may be extended to RGB images by treating each layer like a grayscale image.

Figure 12:
FIG. 12 is examples of an image frame illustrating the spatial effect of diffusion in accordance with various embodiments of the present disclosure.
Figure 12:
Figure 12:
Figure 12:

The diffusion results in an increase in the uncertainty of the pixel values in a neighborhood about the pixel. This is demonstrated in FIG. 12, where the still frame of FIG. 12(a) was taken and diffusion is applied to it repeatedly. FIGS. 12(b), 12(c), and 12(d) show the spatial effect of diffusion in long run. It can be seen that the major grayscales or colors dominate over regions because of the spatial averaging that the diffusion causes. This spatial effect of diffusion allows faster convergence in the existence of jitter and hence the reduction of artifacts caused by it. An overall blurring results as a side-effect without additional compensation. However, the blur seen in the extreme cases of FIG. 12 may be reduced by the state updates applied by the filter, which tries to keep the estimation close to the current frame (H=1).

The effects may also be considered in terms of the entropy of the image and the mutual information between the original image and the image after diffusion. When diffusion takes place, the entropy of the system will increase, which means that the uncertainty in the pixel values will increase. Also, the mutual information between the original frame and the diffused frame will decrease with further diffusion, which points to the same increase in the uncertainty of the pixel values. The decrease in mutual information and increase in entropy causes the dynamic system to expect a larger range of values for a given pixel, a range defined by the local neighborhoods. Therefore, the convergence of the system to a value in this expected range would be easier than a filter with no diffusion.

Figure 13:
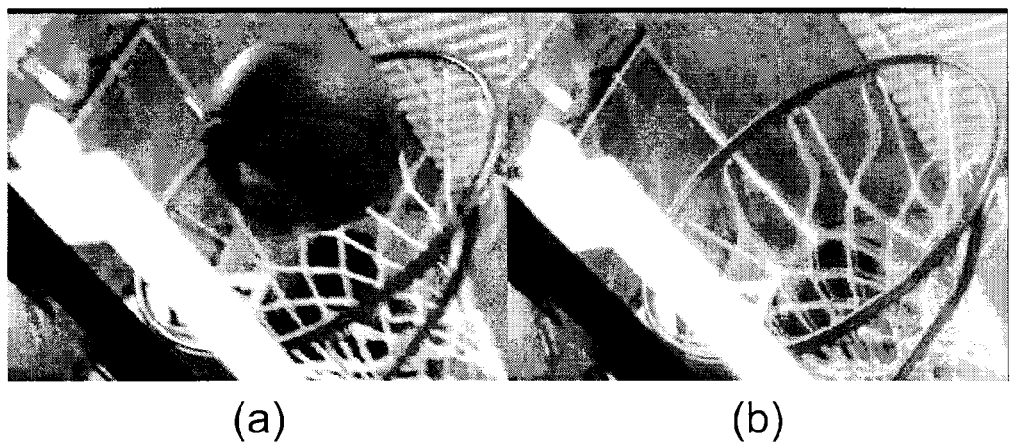
FIGS. 13, 14, 16, and 17 are examples of an image frame illustrating the effect of diffusion adaptation in accordance with various embodiments of the present disclosure.
Figure 14:
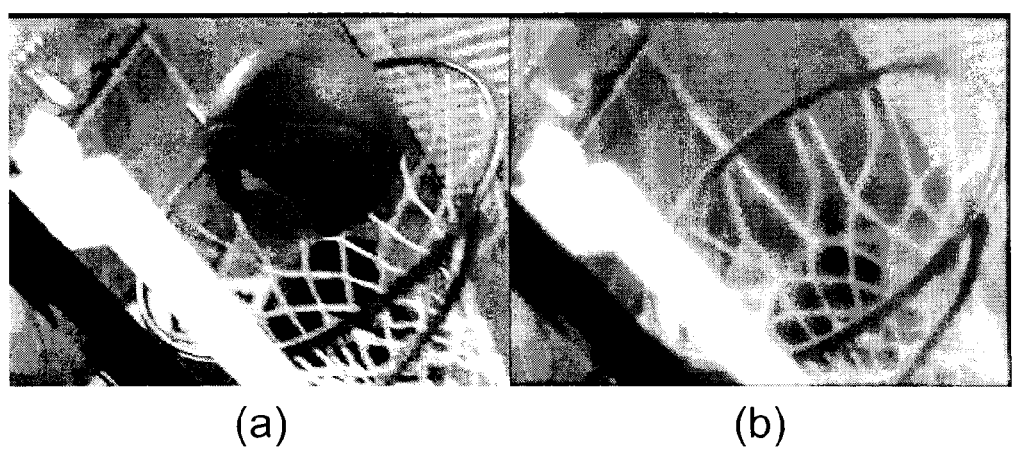

The system with adaptive diffusion was tested using footage from a camera attached behind a basketball backboard. As a ball hits the backboard, there exists a large amount of jitter in the footage which is troublesome for background estimation. Referring to FIG. 13, the performance of the background estimation model is shown without accounting for diffusion. Frame (a) on the left shows the current video image frame, whereas frame (b) on the right shows the background estimation for the frame. It can be seen that the algorithm without the diffusion parameter $\alpha$ suffers from the jitter caused by the impact of the ball and has two copies of the net as a jitter artifact. Referring next to FIG. 14, the same frame in the video sequence is displayed in frame (a). Some diffusion leakage was allowed for by setting $\alpha=0.1$. The effect of diffusion adaptation can be seen in frame (b) of FIG. 14. The adaptation in the jittery environment was much faster, thus the jitter artifact is much less visible. However, constant diffusion throughout the video causes blurry background estimation, which is not desirable. To avoid this situation, the diffusion parameter $\alpha$ may adapt to the jitter in the video footage.

The diffusion can be seen as an attempt to fix the error between the values of neighboring pixels. Thus, when the leak from each pixel to its neighbors takes place, the image should have less difference in local neighborhoods. Keeping this in mind, the formulation of EQN. 20 may be used to determine an instantaneous value for the diffusion coefficient $\alpha$, where the image is considered to have N-by-M pixels.

$$\alpha(t) = \sum_{i=2}^{N-1}\sum_{j=2}^{M-1}\sum_{k=-1}^{1}\sum_{l=-1}^{1} \frac{(x_{i,j}^t - x_{i+1,j+k}^{t-1})^2}{9(N-2)(M-2)} \qquad \text{EQN. 20}$$

Figure 15:
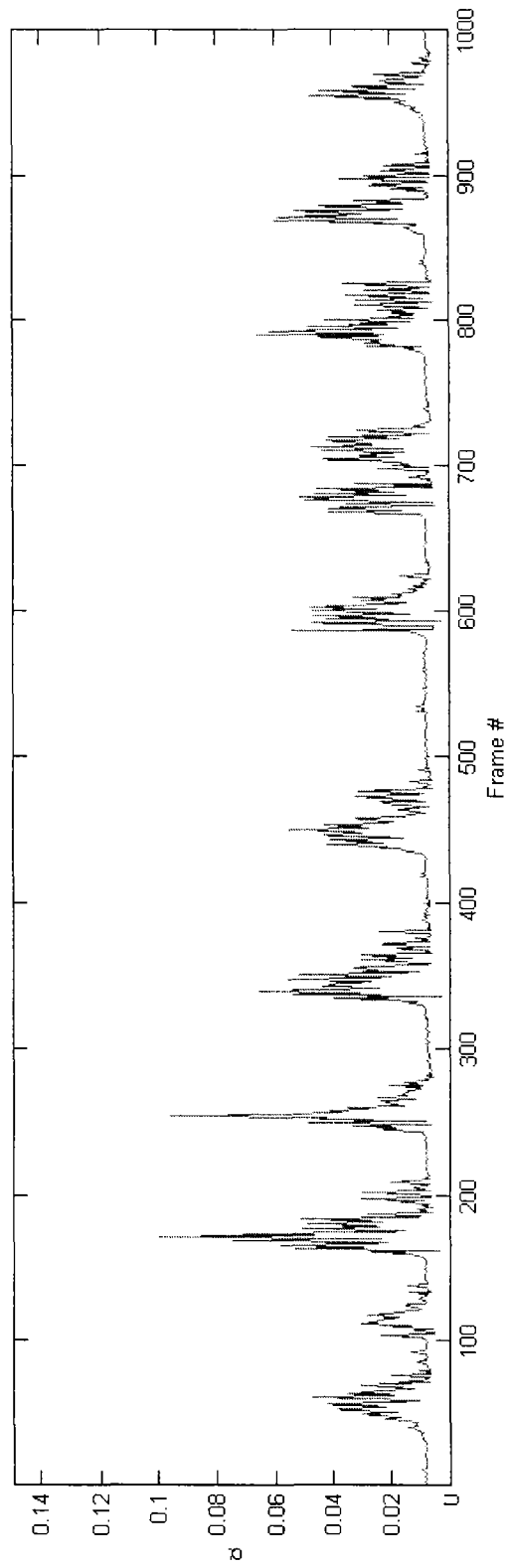
FIG. 15 is a plot of an example of the effect of diffusion adaptation on a diffusion coefficient in the presence of jitter in accordance with various embodiments of the present disclosure.

This adaptation rule provides a value for $\alpha$ in the range [0,1]. It is basically the mean squared difference in the neighborhoods averaged over the whole image. When small neighborhoods (radius of 1) are considered, the values of the pixels are naturally close to each other. However when jitter is present, two consecutive frames will have shifted neighborhood centers. Thus a larger value will be obtained in EQN. 20 when jitter is present. This is demonstrated in FIG. 15. The value of the diffusion coefficient ($\alpha$) is plotted with respect to frames in a video sequence. FIG. 15 shows the diffusion parameter $\alpha$ for each frame number. It can be observed that, when the video footage is not jittery, $\alpha$ is almost zero, whereas the maximum values of $\alpha$ are obtained right after the ball impact occurs. The $\alpha$ values decay back toward zero as the jitter subsides.

Figure 16:
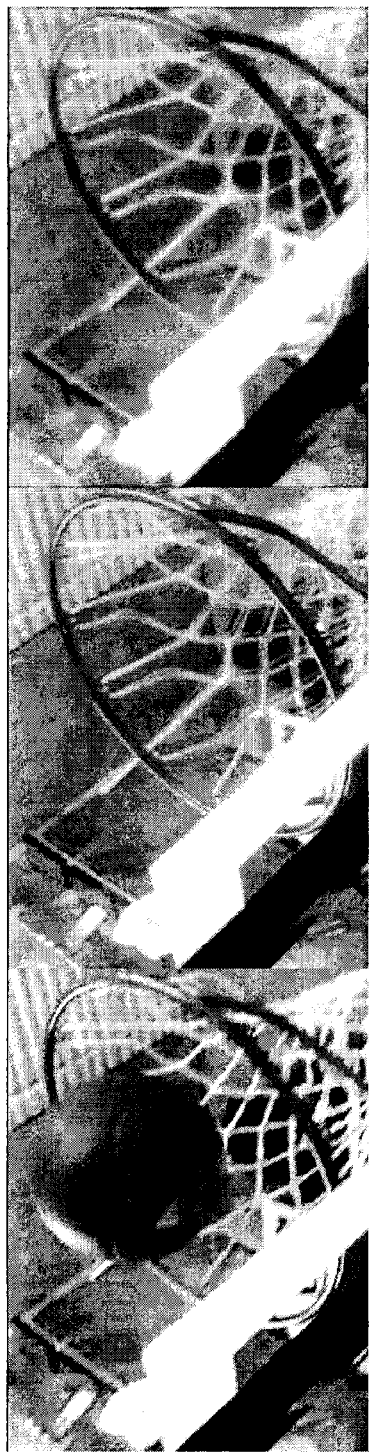
Figure 17:
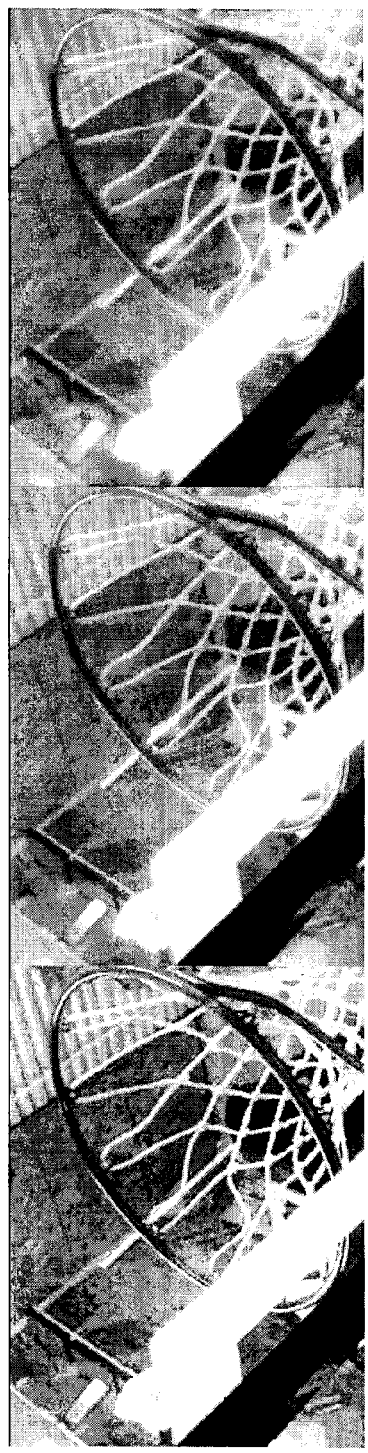

The background estimation results improve considerably with the adaptive diffusion coefficient in use. The estimation has diffusion when there is jitter which speeds up the convergence and removes the jitter artifacts. FIG. 16 demonstrates the faster convergence of the new adaptive model compared to the background estimation without adaptive diffusion. Frame (a) on the left shows the current video image. The center frame (b) shows the background estimation without accounting for diffusion caused by jitter and frame (c) on the right with background estimation including adaptive diffusion. It can be seen that slight blurring appears when using the background estimation with adaptive diffusion. FIG. 17 shows the effect of adaptive diffusion on the background estimation when no jitter is present. Frame (a) on the left shows the current video image without jitter present. Frames (b) and (c) show the background estimation without and with adaptive diffusion, respectively. The blurred vision is not present when there is no impact and the results of both estimation methods have almost the same clarity when jitter disappears.

Figure 18:
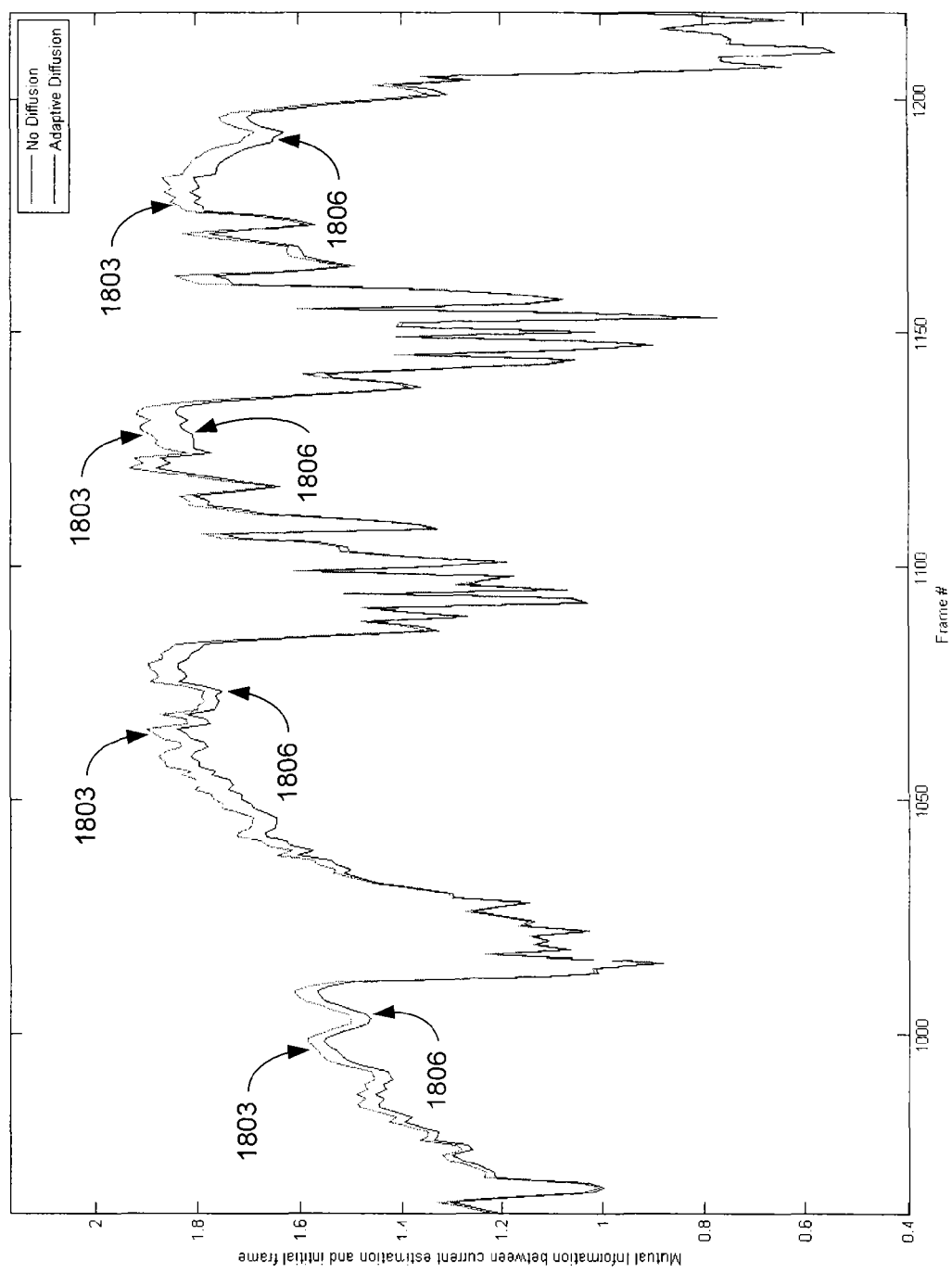
FIG. 18 is a plot of an example of mutual information between the current background estimation and the initial frame illustrating the effect of diffusion adaptation in the presence of jitter in accordance with various embodiments of the present disclosure.

Returning to the information theoretic measure of correntropy, the mutual information between the initial frame and the current estimation by the correntropy filters with no diffusion and adaptive diffusion is examined. The mutual information for both estimations should decrease the moment a ball hits the board. From that point forward, the net changes shape making it difficult to obtain the true background. However, comparing the mutual information between that frame and current estimations can indicate how much jitter artifact is left by the initialization on the estimation. Referring to FIG. 18, show is the mutual information between the current background estimation and the initial frame with no diffusion (curve 1803) and with adaptive diffusion (curve 1806). In FIG. 18, the mutual information for both filters decreases sharply with the ball's impact. Both curves 1803 and 1806 attend an almost identical minimum as the adaptive diffusion correntropy filter defaults to the filter with no diffusion when there is no jitter. This results in the identical response to an environmental change. However, it can be seen from FIG. 18 that the filter with no diffusion (curve 1803) always attends a higher mutual information after convergence, which indicates that the jitter artifacts from the initial frame are more dominant for this filter compared to the adaptive diffusion filter (curve 1806). As both filters default to background estimation with no blur in the absence of jitter, both react same way indicate the lack of artifacts in the adaptive diffusion correntropy filter when jitter is not present.

By introducing adaptive diffusion, it is possible to increase the variance of the pixel values, which in return speeds up the convergence and eliminates the artifacts caused by jittery video footage. A fixed diffusion coefficient can do a good job but creates an undesirable side effect of blurred vision in the background estimation. To overcome this issue, an adaptive rule for the diffusion parameter $\alpha$ is utilized. The use of adaptive diffusion performs much better in jittery environments and provides comparable results when the footage is not jittery. In the adaptive background problem, a kernel bandwidth of 1.5 was used as the RGB values are between 0 and 1. The only remaining free parameter is the step size, which may be adjusted in a range to speed up or slow down the convergence.

The systems and methods for adaptive background estimation that are provided herein can be implemented in hardware, software, firmware, or a combination thereof. In one embodiment, the method can be implemented in software or firmware that is stored in a memory and that is executed by a suitable instruction execution system. If implemented in hardware, as in an alternative embodiment, the system can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), digital signal processor (DSP), etc.

Figure 19:
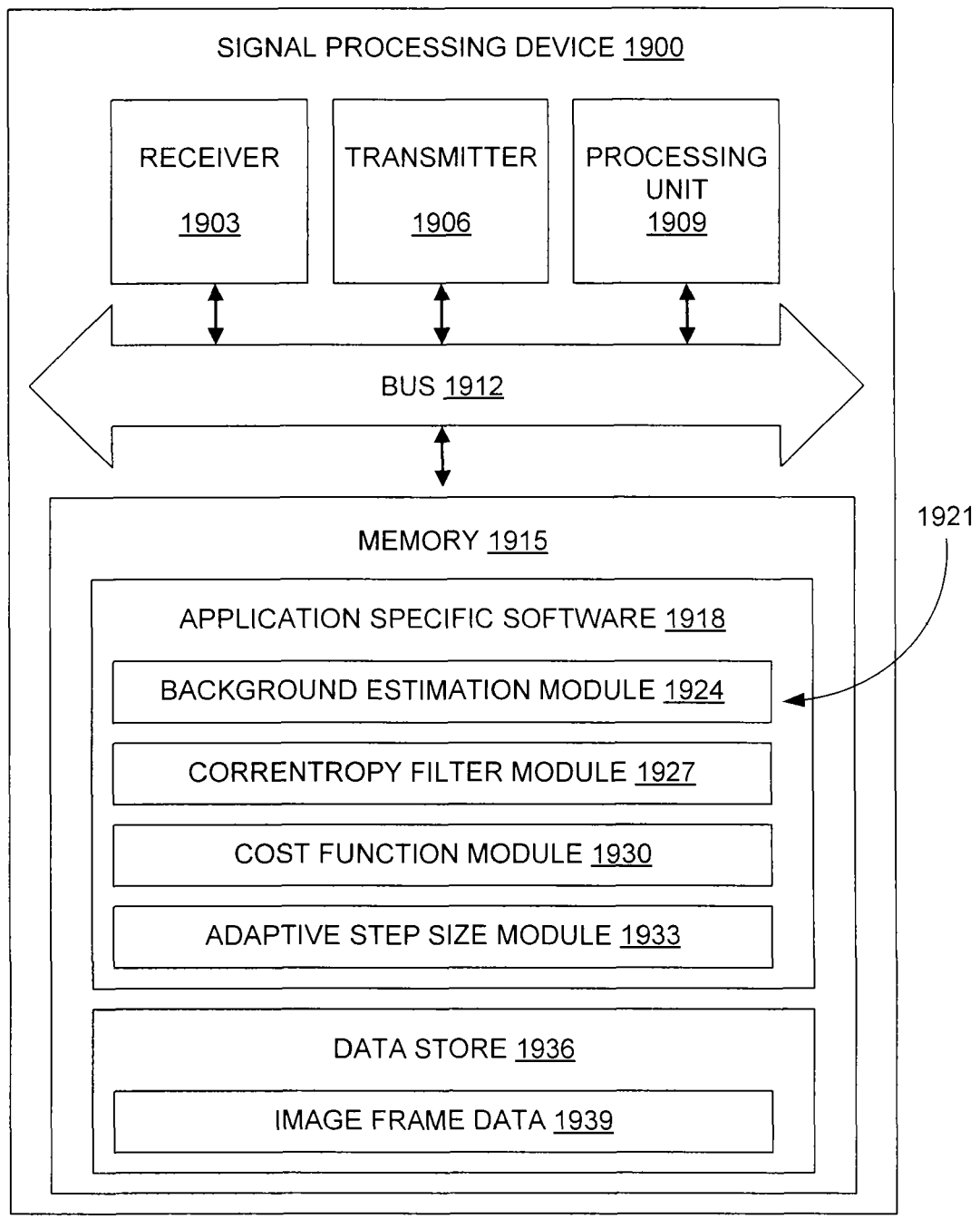
FIG. 19 is a graphical representation illustrating an example of a signal processing device used in FIGS. 1-18 in accordance with various embodiments of the present disclosure.

In some embodiments, the adaptive background estimation described above may be implemented in a signal processing device 1900 such as the one illustrated in FIG. 19. The signal processing device 1900 includes a receiver 1903, transmitter 1906, processing unit 1909, a bus 1912 and a memory 1915. The memory 1915 stores an application specific software 1918 including modules 1921, which include instructions that when executed by the processing unit 1909 perform various operations. As illustrated in FIG. 19, the modules 1921 may be, for example, a background estimation module 1924, a correntorpy filter module 1927, a cost function module 1930, and an adaptive step size module 1933. In some embodiments, the various modules 1921 may correspond to the blocks shown in the adaptive systems of FIG. 3. In addition, the memory 1915 can include a data store 1936 for storage of image frame data 1939 used and/or generated by the adaptive background estimation. The signal processing device 1900 may also be in communication with a display device for rendering the processed information.

The flow chart of FIG. 3 shows the architecture, functionality, and operation of a possible implementation of the adaptive background estimation. In this regard, each block may represent a module, segment, or portion of code, which comprises one or more executable instructions for implementing the specified logical function(s). It should also be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved, as will be further clarified hereinbelow.

The application specific software 1921 can also be stored on a variety of computer-readable media for use by, or in connection with, a variety of computer-related systems or methods. In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Any process descriptions or blocks should be understood as representing modules, segments, or portions of code which include one or more executable instructions for implementing specific logical functions or steps in the process, and alternate implementations are included within the scope of the embodiments described in the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A signal processing device, comprising:
at least one processing unit; and
a memory storing a background estimation system executable in the at least one processing unit, the background estimation system comprising code that when executed by the at least one processing unit cause the signal processing device to separate foreground objects from at least one image frame in a sequence of image frames based at least in part upon a correntropy cost function.

2. The signal processing device of claim 1, wherein the background estimation system further comprises code that when executed by the at least one processing unit cause the signal processing device to initialize a background based upon an initial image frame in the sequence of image frames.

3. The signal processing device of claim 2, wherein the background is adapted based at least in part upon the correntropy cost function to provide an estimated background.

4. The signal processing device of claim 3, wherein the background estimation system is configured to provide a foreground image frame including the foreground images for rendering on a display device.

5. The signal processing device of claim 4, wherein the background estimation system is further configured to provide an estimated background image frame for rendering on the display device.

6. The signal processing device of claim 5, wherein the at least one image frame, the foreground image frame, and the estimated background image frame are provided for concurrent rendering on the display device.

7. The signal processing device of claim 1, wherein the background estimation system causes the signal processing device to separate foreground objects from each image frame in the sequence of image frames based at least in part upon the correntropy cost function.

8. The signal processing device of claim 7, wherein the correntropy cost function adaptively compensates for diffusion in the sequence of image frames.

9. The signal processing device of claim 7, wherein the background estimation system provides a sequence of foreground image frames including the foreground images separated from a corresponding image frame in the sequence of image frames for rendering on a display device.

10. The signal processing device of claim 1, wherein a correntropy filter module is used to separate foreground objects.

11. The signal processing device of claim 1, wherein the sequence of image frames is obtained by the signal processing device from a source in real time and foreground objects are separated from each image frame in real time.

12. A method, comprising:
obtaining, by a signal processing device, an image frame from a sequence of image frames;
performing, by the signal processing device, correntropy filtering on the image frame to separate foreground objects from the image frame; and
providing, by the signal processing device, the foreground objects for rendering.

13. The method of claim 12, further comprising:
obtaining, by the signal processing device, an initial image frame from the sequence of image frames; and
initializing a background based upon the initial image frame.

14. The method of claim 13, further comprising adapting the background based at least in part upon the correntropy filtering on the image frame.

15. The method of claim 12, wherein obtaining an image frame and performing correntropy filtering on the image frame is repeated for each pixel of each frame in the sequence of image frames.

16. The method of claim 15, wherein the signal processing device obtains the next image frame in the sequence of image frames while performing correntropy filtering on the image frame.

17. The method of claim 12, further comprising adapting an estimated background based at least in part upon the correntropy filtering on the image frame.

18. The method of claim 17, wherein the correntropy filtering adapts to compensate for diffusion in the image frame.

19. The method of claim 17, further comprising providing the estimated background for rendering.

20. The method of claim 13, wherein performing correntropy filtering comprises estimating at least one hidden state comprising at least one color value of at least one pixel of the background.

* * * * *